US010025383B2

United States Patent
McNew

(10) Patent No.: US 10,025,383 B2
(45) Date of Patent: Jul. 17, 2018

(54) AUTOMATIC PAUSE AND RESUME OF MEDIA CONTENT DURING AUTOMATED DRIVING BASED ON DRIVER'S GAZE

(71) Applicant: Toyota Motor Engineering & Manufacturing North America, Inc., Erlanger, KY (US)

(72) Inventor: John-Michael McNew, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 147 days.

(21) Appl. No.: 15/214,641

(22) Filed: Jul. 20, 2016

(65) Prior Publication Data

US 2018/0024627 A1    Jan. 25, 2018

(51) Int. Cl.
G09G 5/00 (2006.01)
G06F 3/01 (2006.01)
B60K 35/00 (2006.01)

(52) U.S. Cl.
CPC .............. *G06F 3/013* (2013.01); *B60K 35/00* (2013.01); *G09G 5/003* (2013.01); *B60K 2350/1008* (2013.01); *B60K 2350/352* (2013.01); *B60K 2350/901* (2013.01); *B60K 2350/906* (2013.01)

(58) Field of Classification Search
CPC . G06F 3/013; B60K 35/00; B60K 2350/1008; B60K 2350/352; B60K 2350/906; B60K 2350/901; G09G 5/003
See application file for complete search history.

(56) References Cited

U.S. PATENT DOCUMENTS

| 8,322,856 | B2 | 12/2012 | Vertegaal et al. |
| 8,897,905 | B2 | 11/2014 | Harber et al. |
| 2007/0266191 | A1 | 11/2007 | Schnepp et al. |
| 2010/0033333 | A1* | 2/2010 | Victor ............ A61B 3/113 340/576 |
| 2012/0078509 | A1 | 3/2012 | Choi |
| 2013/0279308 | A1 | 10/2013 | Helm et al. |
| 2016/0185220 | A1* | 6/2016 | Mere ............ B60K 37/06 340/438 |

FOREIGN PATENT DOCUMENTS

WO    2012146474 A1    4/2012

* cited by examiner

*Primary Examiner* — Adam R Giesy
(74) *Attorney, Agent, or Firm* — Christopher G. Darrow; Darrow Mustafa PC

(57) ABSTRACT

A gaze safety module is described herein. In an embodiment, the gaze safety module may comprise a gaze area classifier, a monitoring needs estimator, and a display control. The gaze area classifier may be configured to: receive first sensor data from a sensor; and determine a first gaze classification of a driver based, at least in part, on the first sensor data. The monitoring needs estimator may be configured to: receive driving condition data; and determine one or more gaze requirements. The display control may be configured to: pause playback of a media player based, at least in part, on the first gaze classification and the one or more gaze requirements; and determine a first value for a resume type variable based, at least in part, on the first gaze classification and the one or more gaze requirements.

14 Claims, 5 Drawing Sheets

US 10,025,383 B2

AUTOMATIC PAUSE AND RESUME OF MEDIA CONTENT DURING AUTOMATED DRIVING BASED ON DRIVER'S GAZE

TECHNICAL FIELD

The subject matter described herein relates in general to media playback, and more particularly, to automatic pause and resume of media content during automated driving based on driver's gaze.

BACKGROUND

Many vehicles have a media player. The media player can playback movies, television, video games, and other visual media content on a screen in the vehicle. Some of the vehicles with media players are autonomous vehicles. When a vehicle is operating in autonomous mode, drivers frequently will watch media playback on the media player. Sometimes the driver will look away from the media player and the road to a cell phone or other mobile device. Other times, the driver may be distracted by other incidents that cause the driver to look away from both the road and media player.

SUMMARY

Described herein is an embodiment of a gaze safety module. The gaze safety module may comprise: a gaze area classifier configured to: receive first sensor data from a sensor; and determine a first gaze classification of a driver based, at least in part, on the first sensor data; a monitoring needs estimator configured to: receive driving condition data; and determine one or more gaze requirements; a display control configured to: pause playback of a media player based, at least in part, on the first gaze classification and the one or more gaze requirements; and determine a first value for a resume type variable based, at least in part, on the first gaze classification and the one or more gaze requirements.

Described herein is an embodiment of a method for controlling playback of a media player in an autonomous vehicle. The method may comprise: receiving, by a gaze area classifier, first sensor data from a sensor; determining, by the gaze area classifier, a first gaze classification of a driver based, at least in part, on the first sensor data; receiving, by a monitoring needs estimator, driving condition data; determining, by the monitoring needs estimator, one or more gaze requirements; pausing, by a display control, playback of a media player based, at least in part, on the first gaze classification and the one or more gaze requirements; and determining, by the display control, a first value for a resume type variable based, at least in part, on the first gaze classification and the one or more gaze requirements.

Described herein is an embodiment of an autonomous vehicle comprising: a sensor; a media player; and a gaze safety module comprising: a gaze area classifier configured to: receive first sensor data from the sensor; and determine a first gaze classification of a driver based, at least in part, on the first sensor data; a monitoring needs estimator configured to: receive driving condition data; and determine one or more gaze requirements; a display control configured to: pause playback of the media player based, at least in part, on the first gaze classification and the one or more gaze requirements; and determine a first value for a resume type variable based, at least in part, on the first gaze classification and the one or more gaze requirements.

DETAILED DESCRIPTION

Described herein are embodiments of systems and methods for automatic pause and resume of media playback in an autonomous vehicle based on the driver's gaze. When a vehicle is operating autonomously, a driver of the vehicle may watch media content on a media player. The media player may be positioned in the vehicle such that the driver may glance quickly from the media player to the road. The vehicle may be configured to communicate alerts and messages to the driver via the media player. The driver may receive information about upcoming obstacles or other information that may affect the operation of the vehicle on the media player.

The vehicle may have a driver monitoring camera or other device for determining the driver's gaze position. When the driver is looking at the road, the glance may be referred to as on-road. When the driver is looking at the media player, the glance may be referred to as on-device. When the driver is looking at neither the road nor the media player, the glance may be referred to as away.

Additionally, an automatic rewind function may be provided that rescues the content to the last time the driver was known to be looking at the device. Automatic rescue may ensure that the driver does not miss anything when looking from the media player to the on-road position. By disabling the automatic rescuing function when the driver looks away from both the road and the media player, the driver may be penalized for distracted driving.

In some embodiments, a gaze safety module may automatically pause content playback on the media player if the driver's gaze is not on-device. If the driver looks from the media player to the road, the gaze safety module may automatically resume playback when the gaze returns to on-device. If the driver is looking away from both the media player and the road, e.g., at a mobile device, the driver may not be aware of an upcoming hazard, either because they are not watching the road or miss an alert on the media player. In the case where the driver's gaze is classified as away, the gaze safety module may not immediately resume playback when the gaze returns to on-device. Instead a delay time may be displayed on the media player and the reason for the delay, e.g., the driver is not paying attention, may be displayed on the media player. Thus, the driver may be penalized for distracted driving.

In some embodiments, the gaze safety module may periodically pause playback of media content to cause the driver to look up at the road. The gaze safety module may receive road condition data and other information and make a determination that the driver should look at the road at a certain frequency. In this case, the gaze safety module may pause playback at the determined frequency to cause the driver to look at the road.

Figure 1:
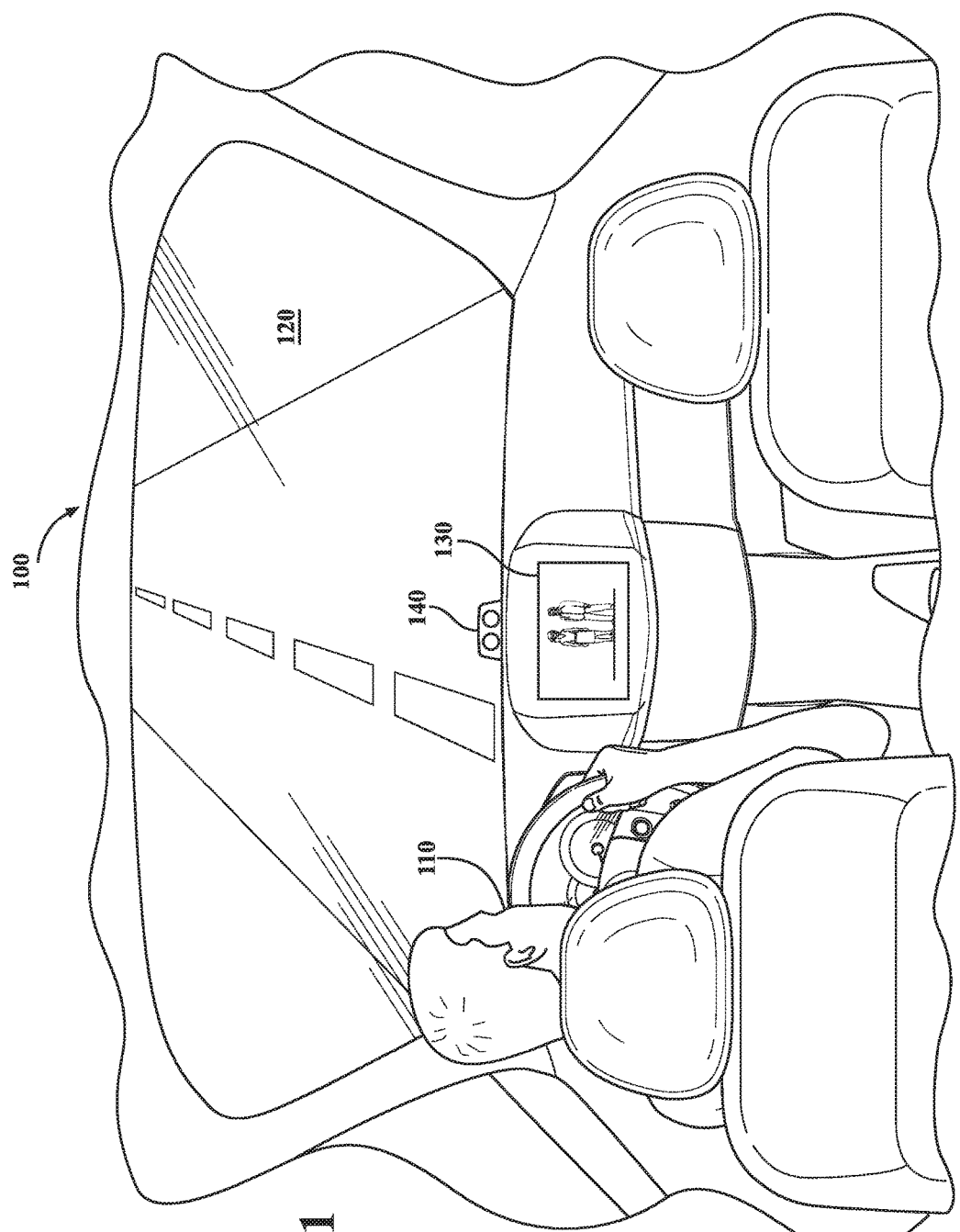
FIG. 1 is a diagram of an embodiment of a view from a vehicle interior.

FIG. 1 is a diagram of an embodiment of a view 100 from a vehicle interior. A driver 110 may direct their gaze to road 120 or media player 130 or some other area that is not road 120 or media player 130. The other area could be a cell phone, the rear seat, or some other area. Sensor 140 may be configured to monitor the location of the gaze of driver 110. Sensor 140 may be any type of sensor capable of monitoring the gaze of the driver 110. Sensor 140 may monitor the angle of the driver's head, the location of the driver's pupils, or some other feature that may indicate where the gaze of driver 110 is resting. Media player 130 may be positioned to allow the driver 110 to look quickly from media player 130 to road 120 and vice versa.

Figure 2:
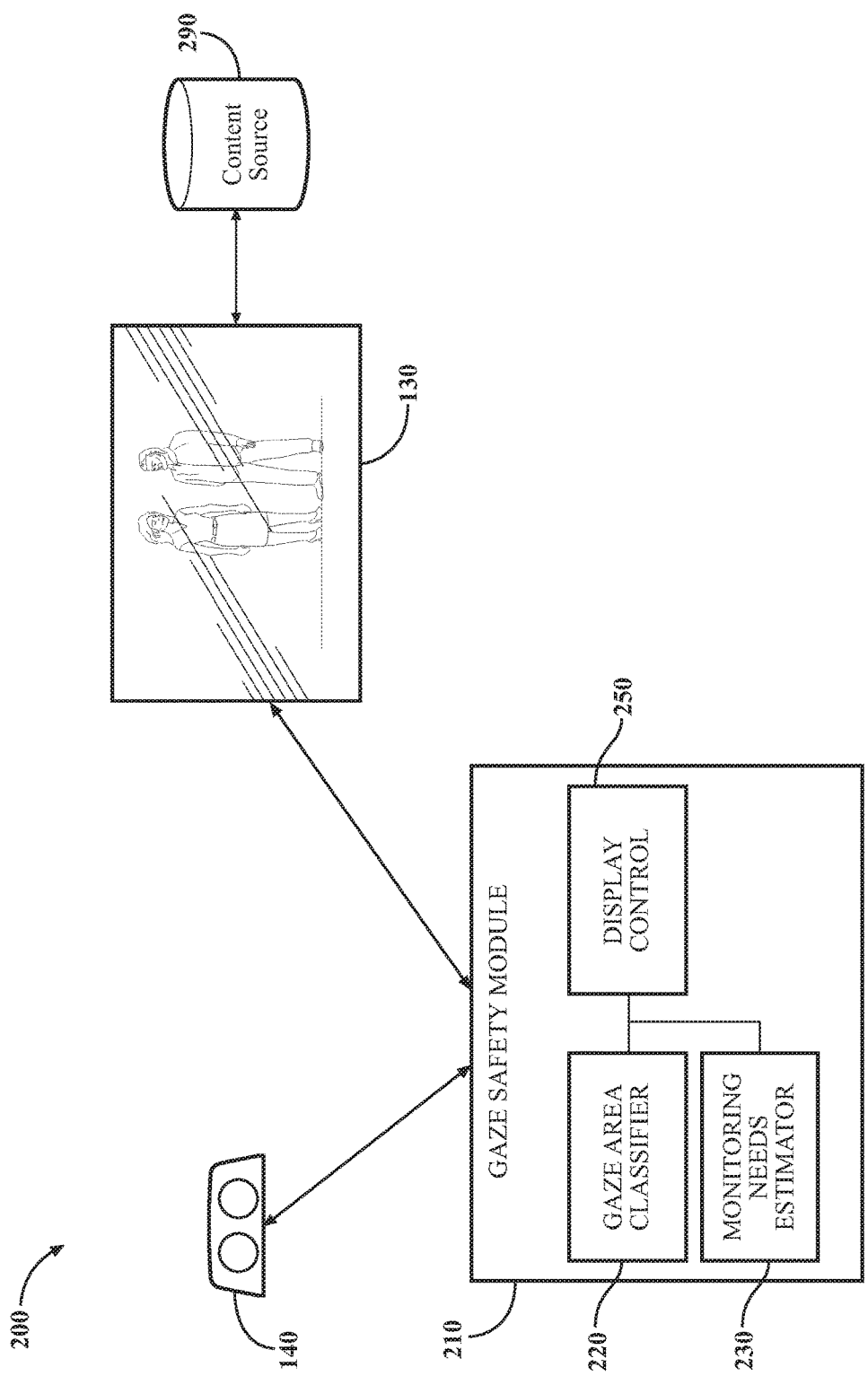
FIG. 2 is a diagram of an embodiment of a system for monitoring the gaze of a driver and controlling playback of a media player.

FIG. 2 is a diagram of an embodiment of a system 200 for monitoring the gaze of a driver, e.g., driver 110, and controlling playback of a media player 130. System 200 may comprise sensor 140, media player 130, a content source 290, and a gaze safety module 210. Content source 290 may be any source of content for media player 130. For example content source 290 may include any combination of local storage, remote storage, steaming video, or any other source of media content. The media content may include, but is not limited to, movies, television shows, video games, animated content, music, or other media content.

Gaze safety module 210 may be a stand-alone module of a vehicle, or may be part of some other system within a vehicle, e.g., an electronic control unit (ECU). Gaze safety module 210 may be implemented in hardware, software, or both. Gaze safety module 210 may comprise a gaze area classifier 220. The gaze area classifier 220 may receive data from sensor 140. Gaze area classifier 220 may classify the current gaze of the driver 110 based on the data received from the sensor 140. The gaze may be classified as one of the following: on-road; on-device, between, or away. An on-road classification may indicate that the driver's gaze is currently on the road 120. An on-device classification may indicate that the driver's gaze is currently on the media player 130. A between classification may indicate that the driver's gaze is currently between the road 120 and media player 130. An away classification may indicate that the driver's gaze is neither on-road, on-device, nor between. An away classification may be used if the driver 110 is looking at a cell phone or some other area.

Gaze safety module 210 may comprise a monitoring needs estimator 230. The monitoring needs estimator estimates an on-road glance frequency requirement and/or a last on-road glance requirement. On-road glance frequency may be how often driver 110 should look at the road 120. For example, in some cases, the driver 110 should look at the road every minute. Last on-road glance requirement may be how long driver 110 can go between looking at road 120. For example, in some cases, the driver 110 should not go longer than five minutes without looking at the road. Monitoring needs estimator 230 may receive data about the operational abilities of the vehicle, road characteristics, and/or other sensor data related to driving conditions of the vehicle and the environment around the vehicle. The monitoring needs estimator 230 may use the received data to determine the on-road glance frequency and/or the last on-road glance requirement.

Gaze safety module 210 may comprise a display control 250. Display control 250 may control the payback of media on media player 130. Display control 250 may receive data from gaze area classifier 220 and/or monitoring needs estimator 230. Display control 250 may track the actual on-road gaze frequency of the driver 110. The actual on-road gaze frequency of the driver 110 may be a count of how often driver 110 has been determined to have a gaze on-road over a period of time. Display control 250 may track the actual on-road glance time of driver 110. The actual on-road glance time of the driver 110 may be an indication of when the gaze of driver 110 was last on-road. Display control 250 may use the received data to control the playback of media on media player 130. For example, the display control 250 may determine to pause playback, resume playback, or enforce a penalty.

Figure 3:
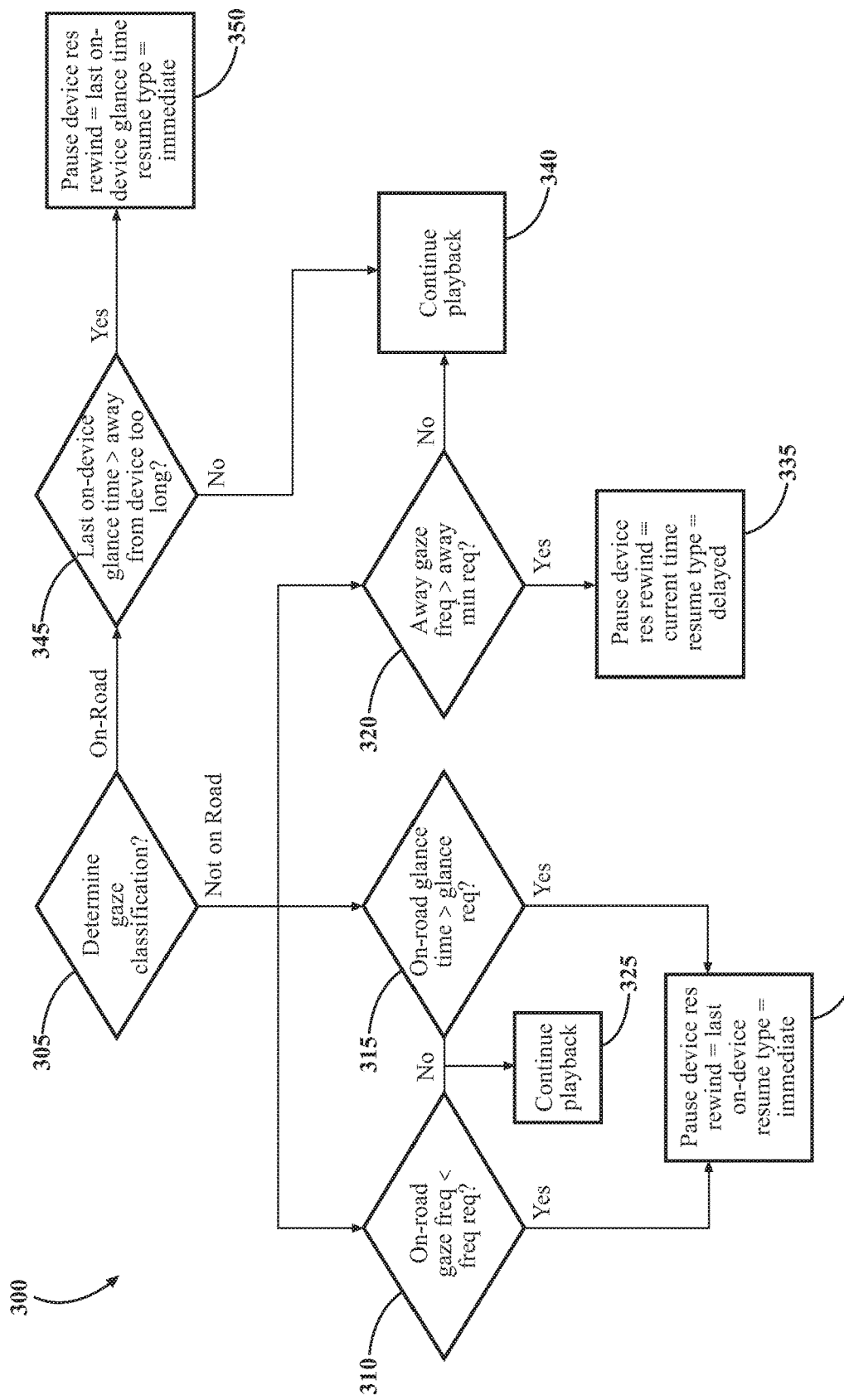
FIG. 3 is a flow diagram of an embodiment of a method for pausing media content playback.

FIG. 3 is a flow diagram of an embodiment of a method 300 for pausing media content playback. Method 300 begins at block 305 by determining where a driver's gaze rests and classifying the gaze. The driver's gaze may be classified by gaze area classifier 220 based on information received from sensor 140. The driver's gaze may be classified as on-road, on-device, away, or between. In an embodiment, on-device, away, and between classifications may be collectively referred to as not on-road. Not on-road classifications may include any classification where the driver's gaze is not on the road. A display control 250 may calculate an observed on-road gaze frequency and/or an observed on-road glance time of the driver 110 based upon the information received from sensor 140. Additionally, the display control 250 may calculate an away glance frequency or away glance time of the driver 110 based upon the information received from sensor 140. The observed on-road gaze frequency may be a measurement of how often the driver's gaze is on the road 120 for a given period of time. The observed on-road glance time may be the time at which the driver 110 last glanced at the road 120. The away glance frequency or away glance time may indicate how long or how often the driver 110 looks away from both the road 120 and the media player 130.

If the driver's gaze is not on-road, the method 300 may continue at block 310. The display control 250 may determine whether the observed on-road gaze frequency of the driver is less than a required on-road gaze frequency. The required on-road gaze frequency may be determined by a monitoring needs estimator 230. If the observed on-road gaze frequency is less than the required on-road frequency, the display control 250 may pause content playback at block 330. Additionally, the display control 250 may also set certain variables when the content playback is paused. The variable may be used when playback of the content is resumed. A "resume rewind" variable may be determined for rewinding the content upon resuming playback. At block 330 the resume rewind variable may be set to the time of the last on-device gaze. A "resume type" variable may be determined for selecting how the content will resume. At block 330 the resume type variable may be set to immediate. A resume type of immediate may indicate that the playback of the content should resume immediately upon a determination that content should resume playback. If the observed on-road gaze frequency is not less than the required on-road frequency at block 310, the display control 250 may continue content playback at block 325.

If the driver's gaze is not on-road at block 305, the method 300 may continue at block 315. The display control 250 may determine whether the observed on-road glance time of the driver is longer than a required on-road glance time. The required on-road glance time may be determined by a monitoring needs estimator 230. If the observed on-road glance time is less than the required on-road glance time, the display control 250 may pause content playback at block 330. At block 330 the resume rewind variable may be set to the time of the last on-device gaze. At block 330 the resume type variable may be set to immediate. If the observed on-road glance time is not longer than the required on-road glance time at block 315, the display control 250 may continue content playback at block 325.

If the driver's gaze is not on-road at block 305, the method 300 may continue at block 320. The display control 250 may determine whether the away gaze frequency of the driver 110 is greater than an away glance minimum frequency. The away glance minimum frequency may be determined by a monitoring needs estimator 230. If the away gaze frequency of the driver 110 is greater than the away glance minimum frequency, the display control 250 may pause content playback at block 335. At block 335 the resume rewind variable may be set to the current time. When the resume rewind variable is the current time, the driver may miss some content, missing content may discourage the driver from looking at the away area. At block 335 the resume type variable may be set to delayed. A resume type of delayed may indicate that the playback of the content should resume after a delay upon a determination that content should resume playback. The delay may act as a penalty to a driver that is distracted by looking away from the road 120 and media player 130. If the away gaze frequency of the driver 110 is not longer than the away glance minimum frequency at block 320, the display control 250 may continue content playback at block 340.

If the driver's gaze is on-road at block 305, the method 300 may continue at block 345. The display control 250 may determine whether the last on-device glance time is greater than an away from device too long time. The last on-device glance time and the away from device too long time may be determined by the display control 250. The last on-device glance time may be how long it has been since the driver 110 has glanced at media player 130. The away from device too long time may be determined based on how long the driver's glance can be away from media player 130 before media player 130 should be paused. If the last on-device glance time is greater than the away from device too long time, the display control 250 may pause content playback at block 350. At block 350 the resume rewind variable may be set to the time of the last on-device gaze. At block 350 the resume type variable may be set to immediate. If the last on-device glance time is not greater than the away from device too long time, at block 345, the display control 250 may continue content playback at block 340.

Figure 4:
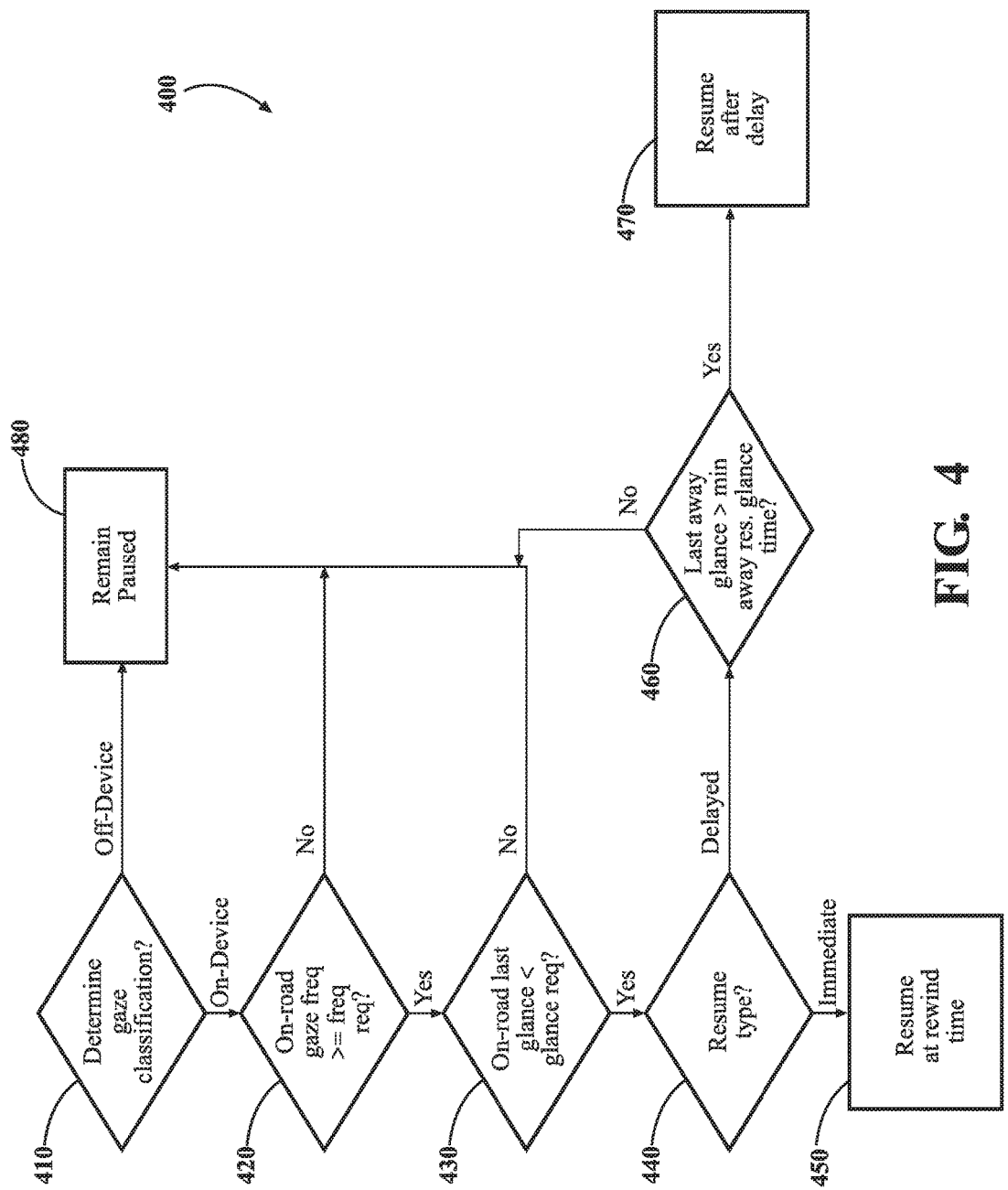
FIG. 4 is a flow diagram of an embodiment of a method for resuming media content playback.

FIG. 4 is a flow diagram of an embodiment of a method 400 for resuming media content playback. Method 400 begins at block 410 by determining where a driver's gaze rests and classifying the gaze. The driver's gaze may be classified by gaze area classifier 220 based on information received from sensor 140. The driver's gaze may be classified as on-device or off-device. An on-device gaze classification may indicate the driver's glance is on media player 130. An off-device gaze classification may indicate the driver's glance is not on media player 130. A display control 250 may calculate an observed on-road gaze frequency and/or an observed on-road glance time of the driver 110 based upon information received from sensor 140. If the gaze classification is off-device, the content may remain paused at block 480.

If the gaze classification is on-device, the method 400 may continue at block 420. The display control 250 may determine whether the observed on-road gaze frequency of the driver is greater than or equal to a required on-road gaze frequency. The required on-road gaze frequency may be determined by a monitoring needs estimator 230. If the observed on-road gaze frequency is greater than or equal to the required on-road frequency, the method 400 may continue at block 430. If the observed on-road gaze frequency is not greater than or equal to the required on-road frequency at block 420, the content playback may remain paused at block 480.

At block 430, the display control 250 may determine whether the observed on-road glance time of the driver is less than a required on-road glance time. The required on-road glance time may be determined by a monitoring needs estimator 230. If the observed on-road glance time is less than the required on-road glance time, the method 400 may continue at block 440. If the observed on-road glance time is not less than the required on-road glance time at block 430, the content playback may remain paused at block 480.

In an embodiment, either block 420 or block 430 may be optional and may be performed in any order. For example, block 420 may be performed and block 430 may be skipped. In another example, block 420 may be skipped and block 430 may be performed. In yet another example, block 430 may be accomplished prior to block 420, with a positive evaluation in block 420 resulting in continuing to block 440.

At block 440, display control 250 may determine the current value of the resume type variable. If the resume type variable is set to immediate, the method 400 may continue at block 450. At block 450, display control 250 may determine the current value of rewind time and rewind the content as necessary. After the content is rewound, playback of the content may resume immediately.

If the resume type variable is set to delayed, the method 400 may continue at block 460. At block 460, display control 250 may determine whether the elapsed time since the last away glance of the driver is greater than a minimum away glance resume time. The minimum away glance resume time may be a predetermined amount of time that must elapse before playback will resume after a glance is classified as away. If the elapsed time since the last away glance of the driver is greater than a minimum away glance resume time, the method 400 may continue at block 470. If the elapsed time since the last away glance of the driver is not greater than a minimum away glance resume time, the content may remain paused at block 480. At block 470, playback of the content may resume after a delay. The delay may be a predetermined delay to penalize away glances.

Figure 5:
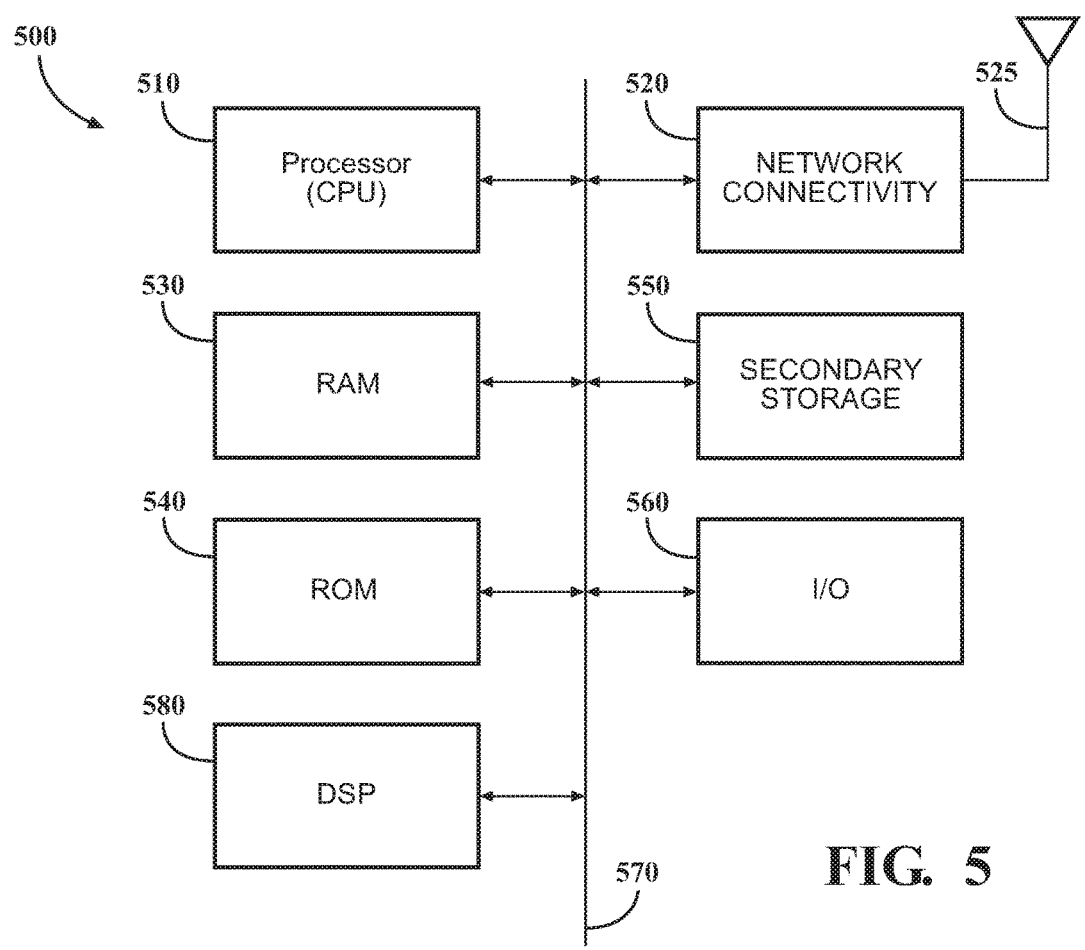
FIG. 5 is a diagram of an embodiment of a system for automatic pause and resume of media content during automated driving, based on driver's gaze.

FIG. 5 illustrates an example of a system 500 that includes a processor 510 suitable for implementing one or more embodiments disclosed herein, e.g., the system 200. The processor 510 may control the overall operation of the device.

In addition to the processor 510 (which may be referred to as a central processor unit or CPU), the system 500 might include network connectivity devices 520, random access memory (RAM) 530, read only memory (ROM) 540, secondary storage 550, and input/output (I/O) devices 560. These components might communicate with one another via a bus 570. In some cases, some of these components may not be present or may be combined in various combinations with one another or with other components not shown. These components might be located in a single physical entity or in more than one physical entity. Any actions described herein as being taken by the processor 510 might be taken by the processor 510 alone or by the processor 510 in conjunction with one or more components shown or not shown in the drawing, such as a digital signal processor (DSP) 580. Although the DSP 580 is shown as a separate component, the DSP 580 might be incorporated into the processor 510.

The processor 510 executes instructions, codes, computer programs, or scripts that it might access from the network connectivity devices 520, RAM 530, ROM 540, or secondary storage 550 (which might include various disk-based systems such as hard disk, floppy disk, or optical disk). While only one CPU 510 is shown, multiple processors may be present. Thus, while instructions may be discussed as being executed by a processor, the instructions may be executed simultaneously, serially, or otherwise by one or multiple processors. The processor 510 may be implemented as one or more CPU chips and may be a hardware device capable of executing computer instructions.

The network connectivity devices 520 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, universal mobile telecommunications system (UMTS) radio transceiver devices, long term evolution (LTE) radio transceiver devices, worldwide interoperability for microwave access (WiMAX) devices, and/or other well-known devices for connecting to networks. These network connectivity devices 520 may enable the processor 510 to communicate with the Internet or one or more telecommunications networks or other networks from which the processor 510 might receive information or to which the processor 510 might output information. The network connectivity devices 520 might also include one or more transceiver components 525 capable of transmitting and/or receiving data wirelessly.

The RAM 530 might be used to store volatile data and perhaps to store instructions that are executed by the processor 510. The ROM 540 is a non-volatile memory device that typically has a smaller memory capacity than the memory capacity of the secondary storage 550. ROM 540 might be used to store instructions and perhaps data that are read during execution of the instructions. Access to both RAM 530 and ROM 540 is typically faster than to secondary storage 550. The secondary storage 550 is typically comprised of one or more disk drives or tape drives and might be used for non-volatile storage of data or as an over-flow data storage device if RAM 530 is not large enough to hold all working data. Secondary storage 550 may be used to store programs that are loaded into RAM 530 when such programs are selected for execution. Content source 290 may be contained in RAM 530, ROM 540, secondary storage 550, or any combination thereof.

The I/O devices 560 may include liquid crystal displays (LCDs), touch screen displays, keyboards, keypads, switches, dials, mice, track balls, voice recognizers, card readers, paper tape readers, printers, video monitors, or other well-known input/output devices. The I/O devices 560 may also include sensor 140 and media player 130. Also, the transceiver 525 might be considered to be a component of the I/O devices 560 instead of or in addition to being a component of the network connectivity devices 520.

Detailed embodiments are disclosed herein; however, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-5, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied or embedded, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium.

What is claimed is:

1. A gaze safety module comprising:
 a gaze area classifier including at least one processor configured to:
  receive first sensor data from a sensor; and determine a first gaze classification of a driver based, at least in part, on the first sensor data;
a monitoring needs estimator including the at least one processor configured to:
receive driving condition data; and
determine one or more gaze requirements;
a display control including the at least one processor configured to:
pause playback of a media player based, at least in part, on the first gaze classification and the one or more gaze requirements; and
determine a first value for a resume type variable based, at least in part, on the first gaze classification and the one or more gaze requirements;
wherein the one or more gaze requirements comprises an on-road glance frequency, the first gaze classification is on-device, and the first value indicates immediate resumption of playback.

2. A gaze safety module comprising:
a gaze area classifier including at least one processor configured to:
receive first sensor data from a sensor; and
determine a first gaze classification of a driver based, at least in part, on the first sensor data;
a monitoring needs estimator including the at least one processor configured to:
receive driving condition data; and
determine one or more gaze requirements;
a display control including the at least one processor configured to:
pause playback of a media player based, at least in part, on the first gaze classification and the one or more gaze requirements; and
determine a first value for a resume type variable based, at least in part, on the first gaze classification and the one or more gaze requirements;
wherein the one or more gaze requirements comprises an on-road glance time, the first gaze classification is on-device, and the first value indicates immediate resumption of playback.

3. A gaze safety module comprising:
a gaze area classifier including at least one processor configured to:
receive first sensor data from a sensor; and
determine a first gaze classification of a driver based, at least in part, on the first sensor data;
a monitoring needs estimator including the at least one processor configured to:
receive driving condition data; and
determine one or more gaze requirements;
a display control including the at least one processor configured to:
pause playback of a media player based, at least in part, on the first gaze classification and the one or more gaze requirements; and
determine a first value for a resume type variable based, at least in part, on the first gaze classification and the one or more gaze requirements;
wherein the one or more gaze requirements comprises an away glance frequency, the first gaze classification is away, and the first value indicates delayed resumption of playback.

4. A gaze safety module comprising:
a gaze area classifier including at least one processor configured to:
receive first sensor data from a sensor; and
determine a first gaze classification of a driver based, at least in part, on the first sensor data;
a monitoring needs estimator including the at least one processor configured to:
receive driving condition data; and
determine one or more gaze requirements;
a display control including the at least one processor configured to:
pause playback of a media player based, at least in part, on the first gaze classification and the one or more gaze requirements; and
determine a first value for a resume type variable based, at least in part, on the first gaze classification and the one or more gaze requirements;
wherein:
the gaze area classifier is further configured to:
receive second sensor data from the sensor; and
determine a second gaze classification of the driver based, at least in part, on the second sensor data; and
the display control is further configured to:
determine a resume delay based, at least in part, on the first value; and
resume playback of the media player based, at least in part, on the second gaze classification, the one or more gaze requirements, and the first value.

5. The gaze safety module of claim 4, wherein the first value indicates delayed resumption of playback, and the resume delay indicates a value greater than zero.

6. The gaze safety module of claim 4, wherein the first value indicates immediate resumption of playback, and the resume delay indicates a value equal to zero.

7. A method for controlling playback of a media player in an autonomous vehicle, the method comprising:
receiving, by a gaze area classifier, first sensor data from a sensor;
determining, by the gaze area classifier, a first gaze classification of a driver based, at least in part, on the first sensor data;
receiving, by a monitoring needs estimator, driving condition data;
determining, by the monitoring needs estimator, one or more gaze requirements;
pausing, by a display control, playback of a media player based, at least in part, on the first gaze classification and the one or more gaze requirements; and
determining, by the display control, a first value for a resume type variable based, at least in part, on the first gaze classification and the one or more gaze requirements;
wherein:
the one or more gaze requirements comprise one of an on-road glance frequency, an on-road glance time, and an away glance frequency;
the first gaze classification is one of on-device and away; and
the first value indicates one of immediate resumption of playback and delayed resumption of playback.

8. The method of claim 7, further comprising:
receiving, by the gaze area classifier, second sensor data from the sensor; and
determining, by the gaze area classifier, a second gaze classification of the driver based, at least in part, on the second sensor data; and
determining, by the display control, a resume delay based, at least in part, on the first value; and resuming, by the display control, playback of the media player based, at least in part, on the second gaze classification, the one or more gaze requirements, and the first value.

9. The method of claim 8, wherein the first value indicates delayed resumption of playback, and the resume delay indicates a value greater than zero.

10. The method of claim 8, wherein the first value indicates immediate resumption of playback, and the resume delay indicates a value equal to zero.

11. An autonomous vehicle comprising:
a sensor;
a media player; and
a gaze safety module comprising:
   a gaze area classifier including at least one processor configured to:
      receive first sensor data from the sensor; and
      determine a first gaze classification of a driver based, at least in part, on the first sensor data;
   a monitoring needs estimator including the at least one processor configured to:
      receive driving condition data; and
      determine one or more gaze requirements;
   a display control including the at least one processor configured to:
      pause playback of the media player based, at least in part, on the first gaze classification and the one or more gaze requirements; and
      determine a first value for a resume type variable based, at least in part, on the first gaze classification and the one or more gaze requirements;
wherein:
   the one or more gaze requirements comprise one of an on-road glance frequency, an on-road glance time, and an away glance frequency;
   the first gaze classification is one of on-device and away; and
   the first value indicates one of immediate resumption of playback and delayed resumption of playback.

12. The autonomous vehicle of claim 11, wherein:
the gaze area classifier is further configured to:
   receive second sensor data from the sensor; and
   determine a second gaze classification of the driver based, at least in part, on the second sensor data; and
the display control further configured to:
   determine a resume delay based, at least in part, on the first value; and
   resume playback of the media player based, at least in part, on the second gaze classification, the one or more gaze requirements, and the first value.

13. The autonomous vehicle of claim 12, wherein the first value indicates delayed resumption of playback, and the resume delay indicates a value greater than zero.

14. The autonomous vehicle of claim 12, wherein the first value indicates immediate resumption of playback, and the resume delay indicates a value equal zero.

* * * * *